United States Patent
Pivar

[15] 3,703,348
[45] Nov. 21, 1972

[54] APPARATUS FOR MOLDING HOLLOW OBJECTS FROM THERMOPLASTIC MATERIALS

[72] Inventor: Stewart Pivar, Muttontown, Long Island, N.Y.

[73] Assignee: Rototron Corporation, Farmingdale, N.Y.

[22] Filed: Oct. 27, 1970

[21] Appl. No.: 84,503

Related U.S. Application Data

[63] Continuation of Ser. No. 724,082, April 29, 1968, abandoned.

[52] U.S. Cl..................................425/173, 425/435
[51] Int. Cl................................................B29c 5/04
[58] Field of Search..18/26 M, 26 RR; 164/116, 287, 164/298; 249/137

[56] References Cited

UNITED STATES PATENTS

| | | | |
|---|---|---|---|
| 3,510,911 | 5/1970 | Alter | 18/26 RR |
| 3,455,483 | 7/1969 | Inklaar | 18/26 RR X |
| 2,344,020 | 3/1944 | Boucher | 164/116 |
| 1,393,216 | 10/1921 | Gutmueuer | 249/137 X |
| 914,459 | 3/1909 | Schwaninger | 164/118 X |

*Primary Examiner*—J. Spencer Overholser
*Assistant Examiner*—John E. Roethel
*Attorney*—Alan K. Roberts and Julian H. Cohen

[57] ABSTRACT

Apparatus is provided for molding thermoplastic articles in hollow form in which a frame or stand is provided which has two stable positions. These are selectively employed to hold a mold in inclined or horizontal attitudes, the mold being provided with an open end on which is placed a cover with an opening therein so that access to the interior of the mold is possible. Thermoplastic material is placed in the mold which is heated so that the material fuses to the mold and the article is thereby formed. Access to the interior of the mold permits improved control over the formation of the objects being molded and permits various possibilities such as forming articles with stripes therein or with mechanical parts incorporated into the object.

6 Claims, 4 Drawing Figures

PATENTED NOV 21 1972　　　　　　　　　　　　　3,703,348

INVENTOR.
STEWART PIVAR

BY
*Roberts & Cohen*
ATTORNEYS

APPARATUS FOR MOLDING HOLLOW OBJECTS FROM THERMOPLASTIC MATERIALS

This application is a continuation of Ser. No. 724,802, filed Apr. 29, 1968, now abandoned.

DRAWING

DETAILED DESCRIPTION

This invention relates to apparatus and methods for molding thermoplastic materials.

Hollow thermoplastic articles have long been made by various well known processes. These processes include blow molding, thermoforming and rotational molding. The present invention is concerned with the molding of polymers and other such materials in the form of liquids or finely divided powders, these materials being moldable into hollow articles by methods which generally involve the distribution of such materials onto the inside surface of a hot mold. Different means can be used to heat the mold and to cause the material to come in contact with the interior surfaces of the mold.

In one known process, a preheated mold is completely filled with molding powder some of which becomes congealed on the mold surface and the balance of which is emptied. In another known process, an excess of molding powder is introduced into a preheated mold which rotates about an inclined axis and in which a pressing, wiping force causes some of the powder to congeal onto the mold surface. The balance of the powder is allowed to fall out of the mold during rotation in this latter process.

In still another known rotational molding process, an enclosed mold containing molding powder is rotated inside an oven simultaneously about mutually perpendicular axes. One hitherto employed apparatus provides that an enclosed mold be rotated about an axis while being subjected to a continuous oscillatory motion about a transverse axis.

For the manufacture of many types of articles, there are shortcomings in the above processes which are overcome by the present invention. For example, it is possible in accordance with the present invention to make massive moldings, the large size of which makes their fabrication impractical in the prior processes. It will also be seen hereinafter that there are certain specialized types of moldings which can be provided in accordance with the instant invention which are not feasible to make in other ways.

In accordance with the present invention, a hollow mold is rotated for predetermined or arbitrarily extended periods of time about an axis fixed alternately in an inclined and in a horizontal position. Heat is supplied by means of gas burners fixed beneath the rotating mold. The invention also teaches the use of a mold, one face of which is open for observation of and access to the article being molded during the molding process, there being further provided means for retaining molding powder within such open mold and for the prevention of heat from entering therein.

An illustrative embodiment of the invention is hereinafter described with reference to the accompanying diagrammatic drawings.

Figure 1:
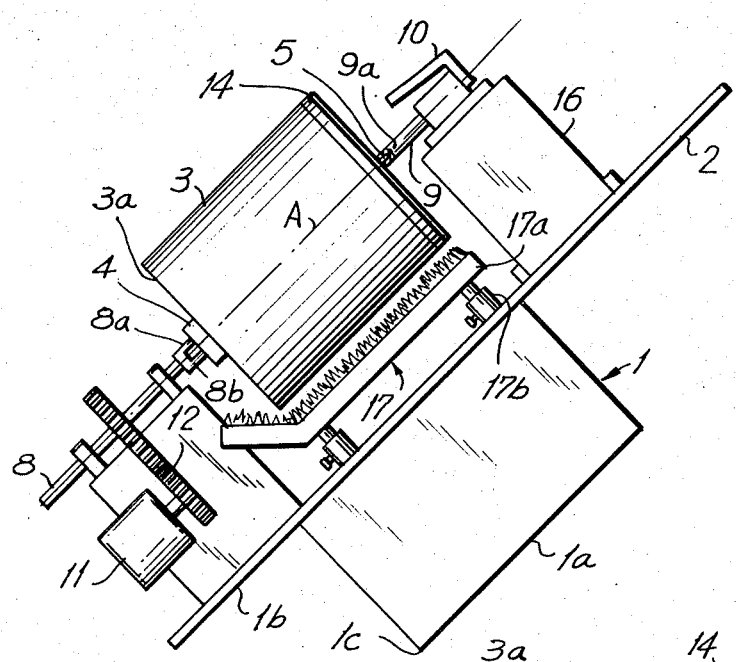
FIG. 1 is a diagrammatic side-elevational view of an apparatus in accordance with one embodiment of the invention, the apparatus being in an inclined attitude.
Figure 2:
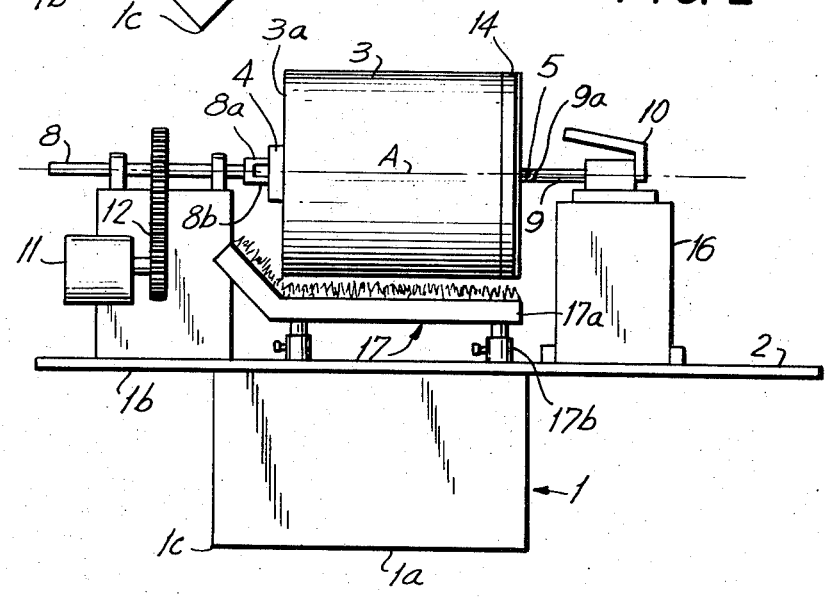
FIG. 2 is a similar view of the same apparatus in a horizontal attitude.
Figure 3:
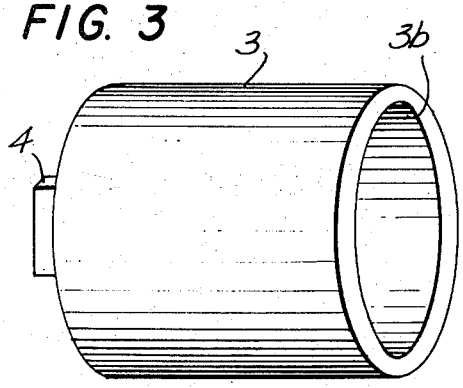
FIGS. 3 and 4 are respectively diagrammatic side-elevational views of a mold and a mold lid used in the apparatus of FIGS. 1 and 2.
Figure 4:
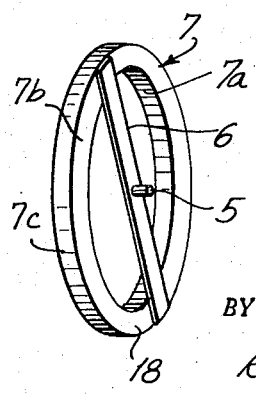

In the drawing is shown a supporting frame or stand 1 capable of being selectively set in an inclined position as illustrated in FIG. 1 or in a horizontal position as in FIG. 2 by means of handles 2 or by means of any convenient mechanical or hydraulic system (not shown). The stand 1 is preferably constructed to have two stable positions of equilibrium, this resulting from the provision of a flat bottom 1a (or the equivalent thereof) and a brace structure 1b which cooperates with lower stand edge 1c in appropriate relation to the center of gravity of the overall structure (i.e., as seen in the drawing, the center of gravity is pivoted by the use of edge 1c from the stable position of equilibrium of FIG. 2 to that in FIG. 1 in which brace structure 1b supports the apparatus with the mold axis inclined).

The frame has rotatably mounted thereon a mold 3 which is shown, for example, as being cylindrical, the mold 3 being supported for rotation about axis A by a drive bracket 4 permanently attached to the center of the bottom 3a of the mold. The mold 3 is also supported for rotation by a support pin 5 fixed to the center of a diametral cross bar 6 which is attached to opposite sides of a large opening 7a in the rim 7b of a mold lid 7. Mold 3 is generally symmetrical with respect to axis A.

The drive bracket 4 is removably attached to a drive shaft 8 by pins 8a and 8b. The support pin 5 withdrawably enters the base of a plunger clamp shaft 9 by means of which it is supported and within which pin 5 is free to rotate.

The plunger clamp shaft 9 engages and disengages the support pin 5 due to the action of a plunger clamp 10 which controllably moves the plunger clamp shaft back and forth a few inches in each direction when a mold is to be mounted or taken away. The drive shaft 8 is rotated by a gear motor 11 and conventional power transmission system 12.

The mold 3 is open at end 3b and is supported for rotation at the open end by means of the aforesaid lid 7 which includes a narrow flange 7c fitting removably over the periphery of the mold and which consists also of the narrow flat powder retaining rim 7b (mentioned above), the function of which is to constrain the charge from falling out of the mold when the mold is in a horizontal position.

A gas burner 17 is attached to the frame 1 in a position beneath the mold so as to direct heat upwardly against the outer surface of the rotating mold without allowing heat to enter the opening in the mold lid 7. For this purpose, the burner terminates at end 17a which is substantially aligned with the end 9a of shaft 9.

The plunger clamp 10 is supported by the plunger clamp support 16 which is attached adjustably to the frame 1 in such a way that its position can be altered back and forth longitudinally so that the apparatus can accommodate molds of varying lengths. This adjustment is of a type that can be made in a few seconds to permit an operator of the apparatus to use selectively molds of different sizes.

The burner 15 is attached to the frame 1 by means of telescopic burner supports 17b which are capable of raising or lowering the burner quickly to accommodate molds of different diameters or widths.

The steps for producing a molded article such as a container molded of powdered polyethylene are outlined below:

The lid 7 is assembled on the mold 3 and the mold is mounted for a molding operation by engaging the drive bracket 4 with the drive shaft 8 and by then engaging the support pin 5 with the plunger clamp shaft 9 by use of the plunger clamp 10. The machine is set in the inclined position as shown in FIG. 1 and a preweighed charge of molding powder is poured in through the opening in the lid. The rotation is started by motor 11 and the burner is lighted. It may be mentioned at this point that, if the charge is very large, only a portion of it need be introduced at the beginning. The remainder can be added later in the molding cycle. It is not necessary to stop the rotation to add additional powder.

The rotation is allowed to continue for a timed interval which is generally one to five minutes at the end of which time the bottom of the mold has been sufficiently coated to provide the desired wall thickness. The machine is then set in the horizontal attitude illustrated in FIG. 2. Rotation is permitted to continue until the remainder of the mold has been coated and fusion is complete. This can be verified visually by observing the inside of the mold through the opening in the lid. This part of the molding cycle generally takes one to ten minutes, although very large moldings with thick walls can take even longer depending also on the characteristics of the material being used.

Modifications can take place in this procedure. For example, an observed thin area can be corrected by adding additional molding powder and returning the machine to the inclined position if necessary. At completion of the article, the mold is dismounted from the machine by disengaging the plunger clamp shaft 9 from the support pin 5 and then disengaging the mold support bracket 4 from the drive shaft 8. The mold is then set aside to cool preferably with the use of a fan which blows air into the opening in the lid.

The molding procedure described above can be modified by returning the machine to the inclined position more than once and by changing the timed intervals for the two positions to vary the wall thickness of the bottom and the sides of the molded article. When very heavy parts are being molded, which may weigh hundreds of pounds, it is found efficacious to introduce the charge into the mold a small portion at a time. A large mass of uncongealed molding material is capable of absorbing heat from the sides of the mold thereby slowing the molding process. For this same reason, it is sometimes found desirable to introduce no material at all until the empty mold has reached a temperature capable of causing fusion.

Certain specialized types of molded articles can be molded in the process described in the present invention due to some uniquely convenient features of the process. For example, a multiplicity of colors or materials can be embodied in a single article. By consecutively adding differently pigmented materials during the cycle, moldings can be made, the outside of which is colored differently than the inside. By using one color in the inclined stage of the cycle and another in the horizontal stage it is possible to produce articles the bottom of which is colored differently than the sides. A simple procedure permits the molding of articles with decorative or identifying stripes or bands of contrasting color. This is accomplished by starting the cycle in the horizontal position and adding small amounts of material to narrow portions of the mold. This last technique is possible because of a phenomenon peculiar to this invention, namely that during most of the molding cycle the unmolded material remains generally, longitudinally motionless with respect to the axis of rotation.

The present process lends itself admirably to the production of moldings embodying molded-in inserts of other materials such as metal members to achieve stiffness or strength, handles, fittings to accommodate pipe connections and other contrivances which can materially increase the utility of the molded part. This procedure is especially convenient because of the ability to halt the molding cycle at a time before the entire charge has been introduced into the mold and at which all the material previously introduced has adhered or fused to the walls of the mold. An insert set in place at this time will be molded in place by the addition of the remainder of the charge. The inside of the mold is very accessible due to the opening in the lid. This opening is typically large enough for the operator to reach both arms into the mold and gain access to any part or zone therein.

In accordance with what has been stated above, it will now be appreciated that the invention provides an apparatus for molding hollow objects, which apparatus comprises a mold with drive means being provided for rotating the mold about an axis and support means being provided to position this axis sequentially and selectively in inclined and generally horizontal attitudes for extended periods of time. The support means may be a stand having two stable positions with the axis being fixed relative to the stand. The mold may be, for example, a cylindrical body with an open end and with a cover detachably engaged at said open end and having an open central portion to permit visual access into the mold, the cover including a rim portion concentrically disposed around the open end to retain material in the mold when the axis is horizontal.

The improved method of the invention as noted above permits a superior control of the molding process while permitting additional possibilities such as using differently colored materials or different types of materials, or incorporating into the article being molded mechanical inserts such as pipe fittings, reinforcements, and so forth.

There will now be obvious to those skilled in the art many modifications and variations of the apparatus and method set forth above. These modifications and variations will not however depart from the scope of the invention if defined by the following claims.

What is claimed is:

1. Apparatus for molding hollow objects comprising a mold, drive means for rotating said mold about an axis, support means adapted for resting on a flat surface and having two stable positions of equilibrium to position the said axis sequentially and selectively in inclined and generally horizontal attitudes for extended periods of time, said support means including lower edge means for pivoting said apparatus between two said stable positions of equilibrium and brace structure means, said apparatus having a center of gravity adapted to be positioned on opposite sides of said edge means, said brace structure means supporting said apparatus with said center of gravity on one side of said edge means with said axis in said inclined attitude, and a heat source fixed relative to the axis of said mold.

2. Apparatus as claimed in claim 1 wherein said mold includes a cylindrical body with an open end and a bottom and a cover detachably engageable with said body at said open end, said cover having an open central portion to permit visual access into said mold and including a rim portion concentrically disposed around said open end to retain material in the mold when the axis is horizontal.

3. Apparatus for molding hollow objects comprising a mold, drive means for rotating said mold about an axis, and support means adapted for resting on a flat surface and having two stable positions of equilibrium to position the said axis sequentially and selectively in inclined and generally horizontal attitudes for extended periods of time, said mold including a cylindrical body with an open end and a bottom and a cover detachably engageable with said body at said open end, said cover having an open central portion to permit visual access into said mold and including a rim portion concentrically disposed around said open end to retain material in the mold when the axis is horizontal, the cover including a diametral part extending across said opening, said drive means including elements axially straddling said mold and coupled in driving relationship with said bottom and diametral part.

4. Apparatus as claimed in claim 3 wherein said support means is a stand having two stable positions, said drive means being mounted on said stand.

5. Apparatus as claimed in claim 4 comprising a burner mounted on said stand and displaceable therewith.

6. Apparatus as claimed in claim 5 wherein said burner includes support means by which the burner is adjustable radially relative to said axis to accommodate different sizes of molds.

* * * * *